A. MAIRE.
PISTON.
APPLICATION FILED MAR. 24, 1917.

1,249,799. Patented Dec. 11, 1917.

Fig. 1ᵃ

Inventor
Auguste Maire
by his Attorney

UNITED STATES PATENT OFFICE.

AUGUSTE MAIRE, OF ARGENTEUIL, FRANCE, ASSIGNOR TO SOCIETE LORRAINE DES ANCIENS ETABLISSEMENTS DE DIETRICH & CIE. DE LUNEVILLE, OF PARIS, FRANCE.

PISTON.

1,249,799.  Specification of Letters Patent.  Patented Dec. 11, 1917.

Application filed March 24, 1917. Serial No. 157,234.

*To all whom it may concern:*

Be it known that I, AUGUSTE MAIRE, citizen of the Republic of France, residing at Route de Bezons, Argenteuil, Seine and Oise, in the Republic of France, have invented new and useful Improvements in Pistons, of which the following is a specification.

This invention has for its object to provide an improved construction of piston for internal combustion engines, wherein the piston rings are arranged away from the upper part that is subjected to high temperatures, and are mounted on a steel collar that encircles the piston and is connected to a guide frame of aluminium on the piston body which is itself made of aluminium.

The accompanying drawings illustrate by way of example three constructions of a piston according to this invention.

In these drawings:—

Figure 1:
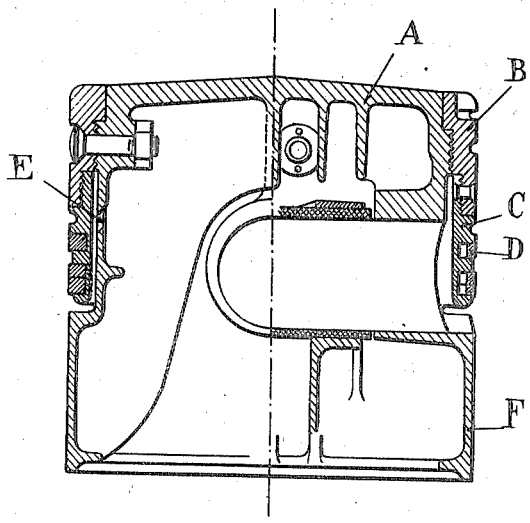

Figures 1 and 1ª are respectively a longitudinal section and a plan of one construction of a piston according to this invention.

Figure 2:
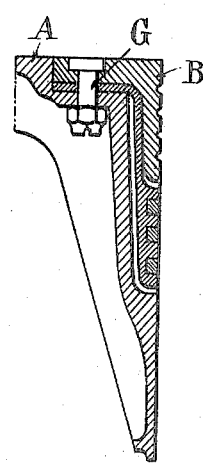
Figure 2:
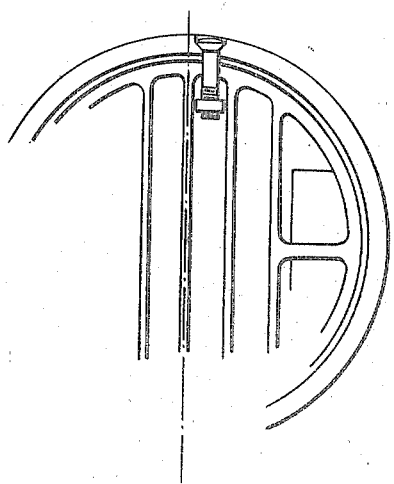
Figure 3:
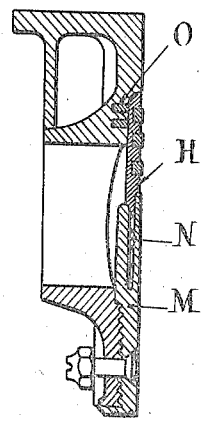

Figs. 2 and 3 are partial longitudinal sections illustrating two modified constructions of the piston.

Referring to Fig. 1, it will be perceived that the piston comprises essentially the piston body proper A on which is screwed a frame B for guiding the piston, the piston body and the frame being made of the same material, for instance aluminium. Upon the frame B there is screwed and riveted a steel collar C which has for its sole function to support the piston rings D.

The oil which is splashed about and which sweeps over the inner surfaces of the piston may flow away between the piston walls proper and the piston ring support so as to lubricate the piston walls through the hole E. This oil serves at the same time for cooling the piston collar C.

In this arrangement the bearing surface of the piston is constituted partly by the frame B and partly by the lower part of the piston body F; the collar C being made slightly smaller in diameter in order that it may not contact at any time with the cylinder wall.

Fig. 2 illustrates a modified construction of the piston which differs from the preceding construction by the manner of assembling the frame B and the ring C that carries the piston rings. In this case, instead of screwing the frame B to the piston body and screwing and riveting the collar C to the frame B, these two parts are assembled to the piston body by means of bolts G.

In the modification shown in Fig. 3, the piston rings are arranged still farther away from the combustion chamber, and the assembling means is transferred to the lower part of the piston, that is to say, into a region which is not exposed to high temperatures.

The piston rings are mounted in a collar H which is assembled in casting with an aluminium collar M. In order to insure intimate union between the steel part H and the aluminium part M, holes N are provided in the steel collar in order that the metal in casting shall enter all these holes and thus make a rigid connection.

Upon the piston body there are mounted small joint rings O which may be of high speed steel, because in this case there is no relative motion between these rings and the parts against which they bear.

These last mentioned rings are provided to prevent the gases in the cylinder from passing into the interior of the piston between the collar H and the piston body proper.

Having now described my invention, what I claim as new and desire to secure by Letters Patent is:

1. A piston for internal combustion engines comprising in combination: a piston body, a guide frame carried by the piston body, means fixing the frame to the said piston body, a collar mounted around the piston body, means fixing the collar to the said guide frame, and piston rings mounted in the said collar, substantially as described and for the purpose set forth.

2. A piston for internal combustion engines comprising in combination: a piston body, a guide frame carried by the piston body, bolts fixing the guide frame to the said piston body, a steel collar mounted around the piston body, means fixing the steel collar to the said guide frame and piston rings mounted in the said steel collar, substantially as described and for the purpose set forth.

3. A piston for internal combustion engines comprising in combination: a piston body, a guide frame made of the same material as the piston body, said guide frame embracing a portion of said piston body and being threaded thereon, bolts fixing the guide frame to the said piston body, a steel collar mounted around the piston body, means fixing the steel collar to the said guide frame, and piston rings mounted in the said steel collar, substantially as described and for the purpose set forth.

4. A piston for internal combustion engines comprising in combination: a piston body, a guide frame made of the same material as the piston body, said guide frame embracing a portion of said piston body and being threaded thereon, bolts fixing the guide frame to the said piston body, a steel collar provided with circular grooves and which is mounted around the piston body and threaded to the guide frame and piston rings mounted in the grooves of the said steel collar, substantially as described and for the purpose set forth.

5. A piston for internal combustion engines comprising in combination: a piston body made of aluminium, a guide frame made of aluminium embracing a portion of said piston body and being threaded thereon, bolts fixing the guide frame to the said piston body; a steel collar provided with circular grooves and which is mounted around the piston body and threaded to the said guide frame, and piston rings mounted in the grooves of the steel collar, substantially as described and for the purpose set forth.

In testimony whereof I have signed my name to this specification in the presence of two subscribing witnesses.

AUGUSTE MAIRE.

Witnesses:
LOUIS MOSES,
CHAS. P. PRESSLY.